United States Patent [19]
Hastings

[11] Patent Number: 5,924,829
[45] Date of Patent: Jul. 20, 1999

[54] GOOSENECK-TYPE ROADWAY-CHASSIS

[76] Inventor: Thomas M. Hastings, 9708 Valaretta Dr., Gretna, Nebr. 68028

[21] Appl. No.: 08/848,211

[22] Filed: Apr. 29, 1997

[51] Int. Cl.$^6$ ........................................................ B60P 7/13
[52] U.S. Cl. ................................ 410/82; 410/54; 410/72; 410/77; 280/DIG. 8
[58] Field of Search .................................. 410/54, 77, 82, 410/83, 71, 72, 73, 76; 280/DIG. 8, 406.1, 656; 248/500, 503, 681

[56] References Cited

U.S. PATENT DOCUMENTS

| | | | |
|---|---|---|---|
| 3,508,762 | 4/1970 | Pratt | 280/407.1 X |
| 3,614,153 | 10/1971 | Tantlinger et al. | 410/82 X |
| 3,767,255 | 10/1973 | Bertolini | 410/82 |
| 4,352,613 | 10/1982 | Bertolini | 410/82 |
| 4,496,187 | 1/1985 | Pontecorvo | 410/71 X |
| 4,969,659 | 11/1990 | Ehrlich | 280/407.1 |
| 5,507,514 | 4/1996 | Jacques | 280/DIG. 8 X |
| 5,794,960 | 8/1998 | Sill et al. | 280/DIG. 8 X |

FOREIGN PATENT DOCUMENTS 1411461  10/1975  United Kingdom .................. 248/500

*Primary Examiner*—Stephen T. Gordon
*Attorney, Agent, or Firm*—George R. Nimmer

[57] ABSTRACT

The prior art teaches rudimentary "gooseneck-type roadway-chassis" advocated for overlyingly attachably removably accommodating, and directionally longitudinally between its rear-end and an elevated goosenecked front-end, a single only cargo-container of encountered-length. Herein disclosed is a novel concept for improved "gooseneck-type roadway-chassis" that is alternatively adaptable for removable attachment thereatop either: a single extended-overall-length cargo-container underlyingly centrally longitudinally provided with a partial-tunnel channel for the chassis forward gooseneck; or two longitudinally consecutive short-length cargo-containers devoid of underlying channel. For the herein disclosed invention: the chassis gooseneck elevated frontal-end is dually provided in transverse separation with internal and longitudinally-retractable attachment pins and also with topical twistlocks; and immediately rearwardly of the chassis gooseneck portion also additionally provided with reciprocatably-elevational and transversely separated twistlocks for removably thereatop attaching a serially forward short-length cargo-container.

3 Claims, 4 Drawing Sheets

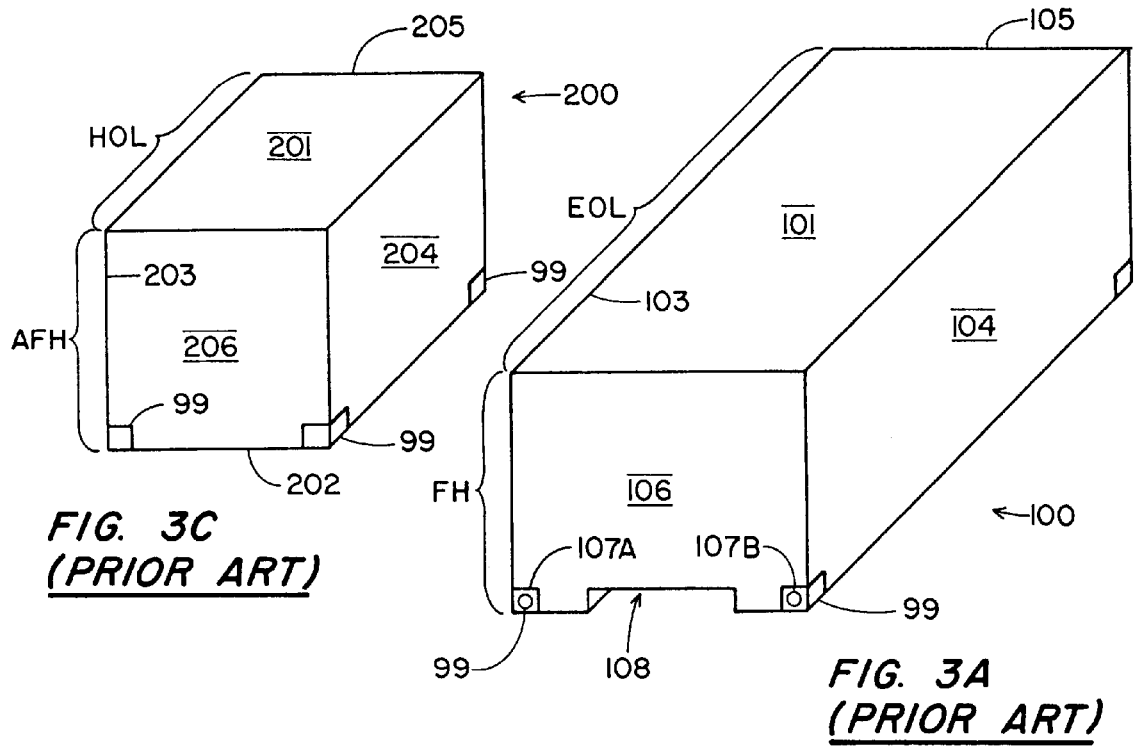
FIG. 3C (PRIOR ART)
FIG. 3A (PRIOR ART)
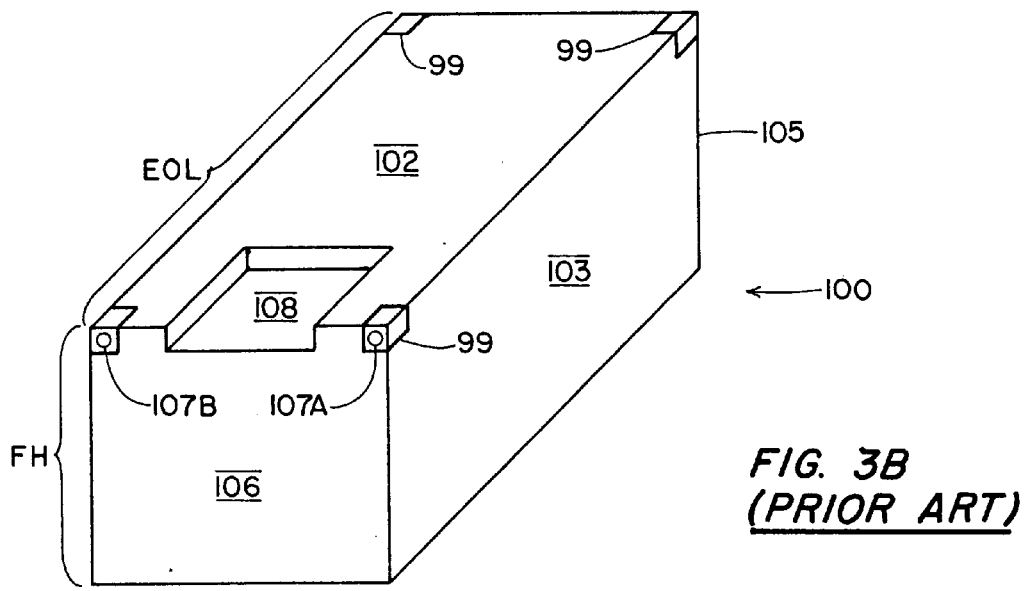
FIG. 3B (PRIOR ART)

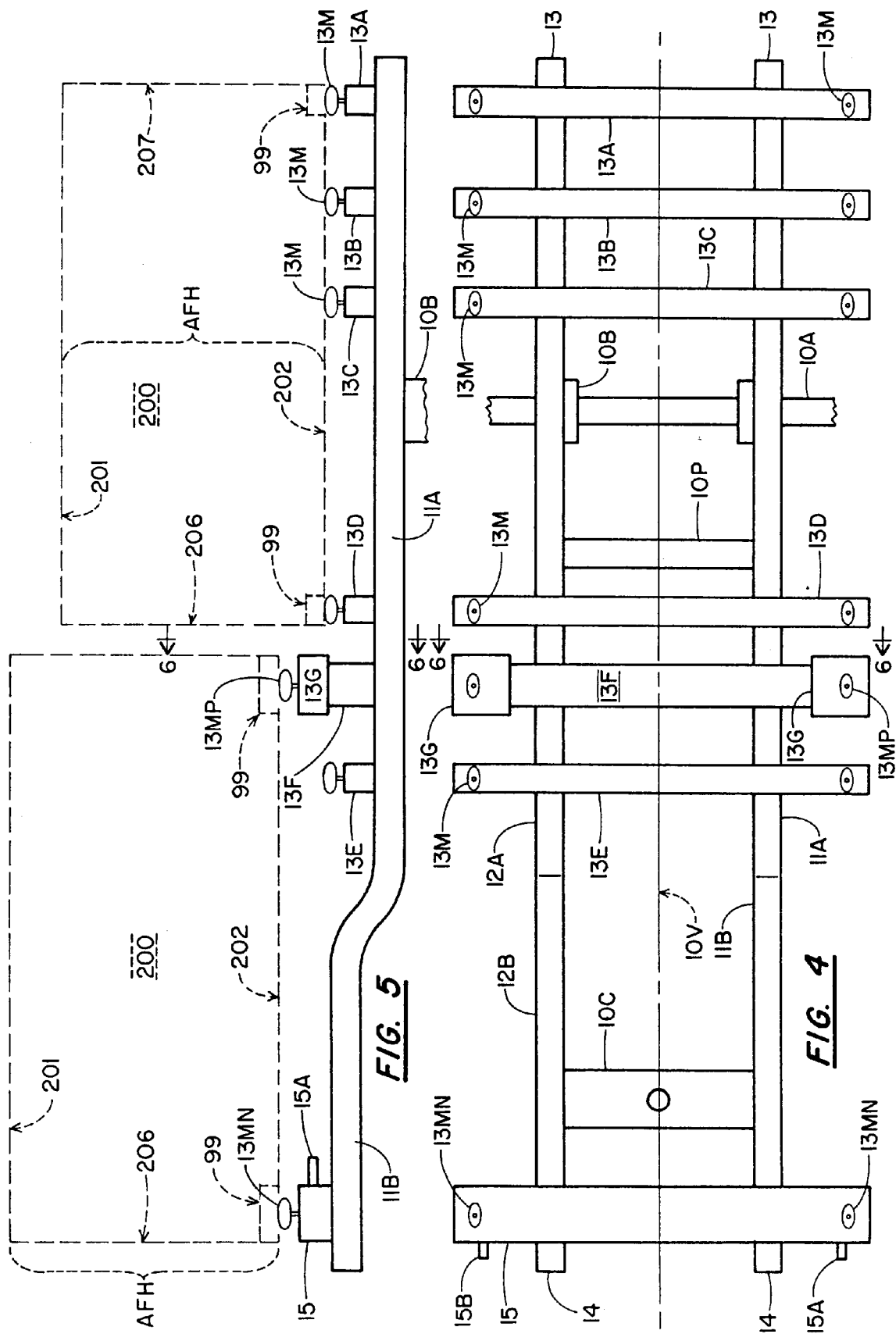

GOOSENECK-TYPE ROADWAY-CHASSIS

BACKGROUND OF THE INVENTION

Drawing FIGS. 1 and 2 depict a typical prior art structure (e.g. 10) for "gooseneck-type roadway-chassis" adapted to overlyingly removably attach a single cargo-container (e.g. 100 of FIGS. 3A & 3B; 200 of FIG. 3C; etc.).

Such typical "gooseneck-type roadway-chassis" (10) comprises a pair of directionally longitudinally extending parallel rails (11, 12) maintained (e.g. 10C, 10P) in flanking parallel relationship to an intervening vertical-plane (10V). Such parallel rails (11, 12) have a major rearward-length (11A, 12A) rearwardly terminating at chassis rear-end 13, and a minor and elevated "gooseneck" forward-length (11B, 12B) forwardly terminating at chassis front-end 14 and having thereat a directionally transversely extending horizontal structural member 15. Reference character 10C refers to a horizontal connector between members 11B and 12B and centrally-provided along vertical-plane 10V with a location 10D to accommodate a towing-tractor "5th-wheel-pin coupler" (traditional, and not shown). Reference character 10B refers to rails-depending journal means for a horizontal axle (10A) for chassis wheels (10W) that are conventionally downwardly-impingeable upon a horizontal roadway-substrate (9). Reference characters 10E and 10F refer gooseneck-depending (e.g. from 11B and 12B), and upwardly-retractable conventional frontal-props that are selectively downwardly impingeable upon a such underlying substrate (9).

Internally within front-end connector member 15, and flanking vertical-plane 10V, are directionally longitudinally movable pins (15A, 15B) to removably securely accommodate corner-castings (99) frontal horizontal-holes (107A, 107B, respectively) of an overlyable extended-overall-length (EOL) cargo-container (e.g. 100 of FIGS. 3A and 3B) having an underlying longitudinal partial-tunnel-like channel (108).

And in the foregoing regard, the reader's attention is called to prior art drawing FIGS. 3A and 3B for typical prior art cargo-container (100) of extended overall-length (EOL) and of finite-height (FH), and also to prior art drawing FIG. 3C for typical prior art cargo-container (200) of "half-overall-length" (HOL) and of arrested-height (AFH) and wherein:

A such conventional extended-overall-length (EOL) and generous finite-height (FH) prior art cargo-container (100) comprises: horizontal and opposed upper-panel 101 and lower-panel 102; upright sideward panels (103, 104) connecting panels 101 and 102; upright rear-panel 105 and upright front-panel 106 (together connecting panels 101, 102, 103, and 104). Located at the four-corners of lower-panel 102 are such corner-castings 99 (as in U.S. Pat. Nos. 3,486,787 and 4,459,072 for twistlocks 13M herein), and respectively provided at front-panel 106 with such horizontal-holes 107A and 107B. Lowerpanel 102 along vertical-plane 10V, commencing from front-panel 106, is provided with a partial-tunnel channel 108 for downwardly flankingly embracing "gooseneck" frontal-rails portion (11B, 12B). But for a conventional halfwise-extended-length (HOL) and normally of less than 20-feet-length, and of arrested-height AFH, prior art cargo-container 200 generally comprises: horizontal and opposed upper-panel 201 and lower-panel 202; upright sideward panels (203, 204) connecting panels 201 and 202; and upright rear-panel 205 and upright front-panel (connecting panels 201–204). Located at the four-corners of lower-panel 202 are such aforedescribed corner-castings (99).

And with further regard to the prior art mentioned in the immediately preceeding paragraphs: the such prior art chassis (10) and atop rails' rearward-lengths 11A and 12A further comprises there atop a plurality of attached, directionally transversely extending, and longitudinally consecutively-spaced bolsters (13) including: a rearwardmost bolster 13A, a forwardmost bolster 13E, and longitudinally consecutively therebetween intermediate bolsters 13B–13D. Each of the said bolsters 13, in outwardly flanking relationship to said rails' parallel rearward-lengths 11A and 11B, is conventionally provided theratop with such conventional twistlocks 13M alluded to hereabove.

Accordingly, in view of the disclosures made in the five immediately preceding paragraphs, and in further regard to prior art drawing FIG. 1, and in further regard to the removably attached (13M, 99, 15, and 107) phantom-lines) for such overlying cargo-containers (100, 200):

Every such extended-overall-length cargo-container (100) conventionally at such corner-castings frontal horizontal-holes (107) is removably attached with such horizontally-reciprocatable attachment-pins (15), and has its underlying partial-tunnel channel (108) downwardly flanking rails' elevated "gooseneck" forward-length 11B–12B (whereby such cargo-container height FH meets highway Regulations; and every such extended-overall-length (EOL) cargo-container has its rear-panel (105) corner-castings (99) appropriately removably connected to bolster twistlocks (13M). In the latter regard: 105A might refer to a rear-panel of a 44-feet-length cargo-container at rearward-most bolster 13A; 105B might refer to a rear-panel of a 42-feet-length cargo-container (100) at bolster 13B; and 105C might refer to the rear-panel of a 40-feet-length cargo-container attached at bolster 13C; and also in the latter regard a such abbreviated-overall-length cargo-container (200), and which traditionally lacks a such underlying partial-tunnel channel (108): conventionally has its front-end (206) and its rear-end (205) lower-corner-castings (99) removably relegatably attached to the twistlocks (13M) on bolsters 13D and 13E which are traditionally relegated to the chassis rails' rearward-lengths (11A, 12A).

Thus, it will be appreciated from the foregoing description of the prior art, that such "gooseneck-type roadway-chassis" (e.g. 10) of the prior art are deficient in that, though their overall longitudinal-length (13–14) might theoretically accommodate therealong, two half-length cargo-containers (200), the prior art makes no structural provision to do so and within the heightwise (e.g. AFH at goosenecked rails 11B & 12B) requirements of Governmental Highway Regulations.

General Objectives of the Present Invention

In view of the foregoing discussion of prior art disclosures, it is accordingly the general objective of the present invention to provide improved "goosneck-type roadway-chassis" that is alternatively adaptable to attachably accommodate thereatop: either, two consecutive arrested-length (200) cargo-containers, or, a single elongated-length (100) cargo-container, and in either situation in conformity with roadway-height restrictions of Highway Regulations.

General Statement of the Invention

With the above general objectives in view, and together with other ancillary and related objectives which will become more apparent as this description proceeds, the novel improved "gooseneck-type roadway-chassis" concept of the present invention generally comprises: a pair of horizontal elongate rails which at their forward-ends are commonly perpendicularly provided with a frontal-member, such parallel rails including major rearward-lengths and minor and elevationally higher (gooseneck) forward-lengths, the rails' rearward-lengths being commonly perpendicularly provided thereatop with a consecutive plurality of horizontal bolsters endwardly provided with twistlocks for removably attaching rearward corner-castings of an overlying cargo-container, and with further regard for removably frontally and alternatively attaching differing cargo-containers, the chassis frontal-member is dually provided with alternately employable retractable attachment-pins and thereabove with such twistlocks, and in the latter regard, the rails' rearward-lengths are additionally forwardly provided with a secondary horizontal bolster having vertically reciprocatably movable endwise twistlocks.

BRIEF DESCRIPTION OF THE DRAWING

In the drawing, wherein like characters refer to like parts in the several views, and in which:

FIGS. 3A and 3B (aforedescribed) are perspective views of a representative extended-overall-length cargo-container (100) of the prior art that is singly overlyingly attachable along the length of such prior art "gooseneck-type roadway-chassis" (10);

FIG. 3C (aforedescribed) is a perspective view of a representative half-overall-length cargo-container (200) of the prior art that is heretofore singly overlyingly attachable only along a medial-portion of a such prior art "gooseneck-type roadway-chassis" (10);

FIG. 4 is a top plan view similar to FIG. 2 of a representative improved "gooseneck-type roadway-chassis" (10M) of the present invention;

FIG. 5 is an elevational view similar to FIG. 1 of a sideward elevational view of a such representative improved embodiment (10M);

DETAILED DESCRIPTION OF THE DRAWING

The representative embodiment (10M) of the improved "gooseneck-type roadway-chassis" of drawing FIGS. 4–7 includes all the structural elements of the prior art "gooseneck-type roadway-chassis" (10) of drawing FIGS. 1 and 2, but structurally differs from (10) in the following respects for improved embodiment 10M:

(a) the rails' forward-length terminal frontal-member 15 is additionally topically provided (in flanking relationship to vertical central-plane 10V and in overlying relationship to the retractable attachment-pins 15A & 15B) with such prior art twistlocks 13M (but for FIGS. 4–7 distinguishable denominated as 13MN); and (b) the rails' rearward-lengths 11A & 12A (located below rails' forward-lengths 11B and 12B) is thereatop provided with a directionally transversely and horizontally extending secondary-bolster 13F (akin to primary prior art bolsters 13A–13E), and which secondary-bolster 13F is endwardly provided with vertically reciprocatable members 13G and topically therefrom with such prior art twistlocks 13M (but for FIGS. 4–7 denominated as 13MP). In the latter regard, such vertically reciprocatable endwise collars 13G (which surround endwise portions of secondary-bolster 13F), might have directionally-longitudinal holes (below attachment-pins 15A & 15B) that respectively accommodate removable anchoring-pins 13T. Thus, such secondary-bolster twistlocks 13MP have selectable elevations (13T) both below, and co-planar with, rails' gooseneck frontal-member endward twistlocks (13MN).

Figures 1, 2:
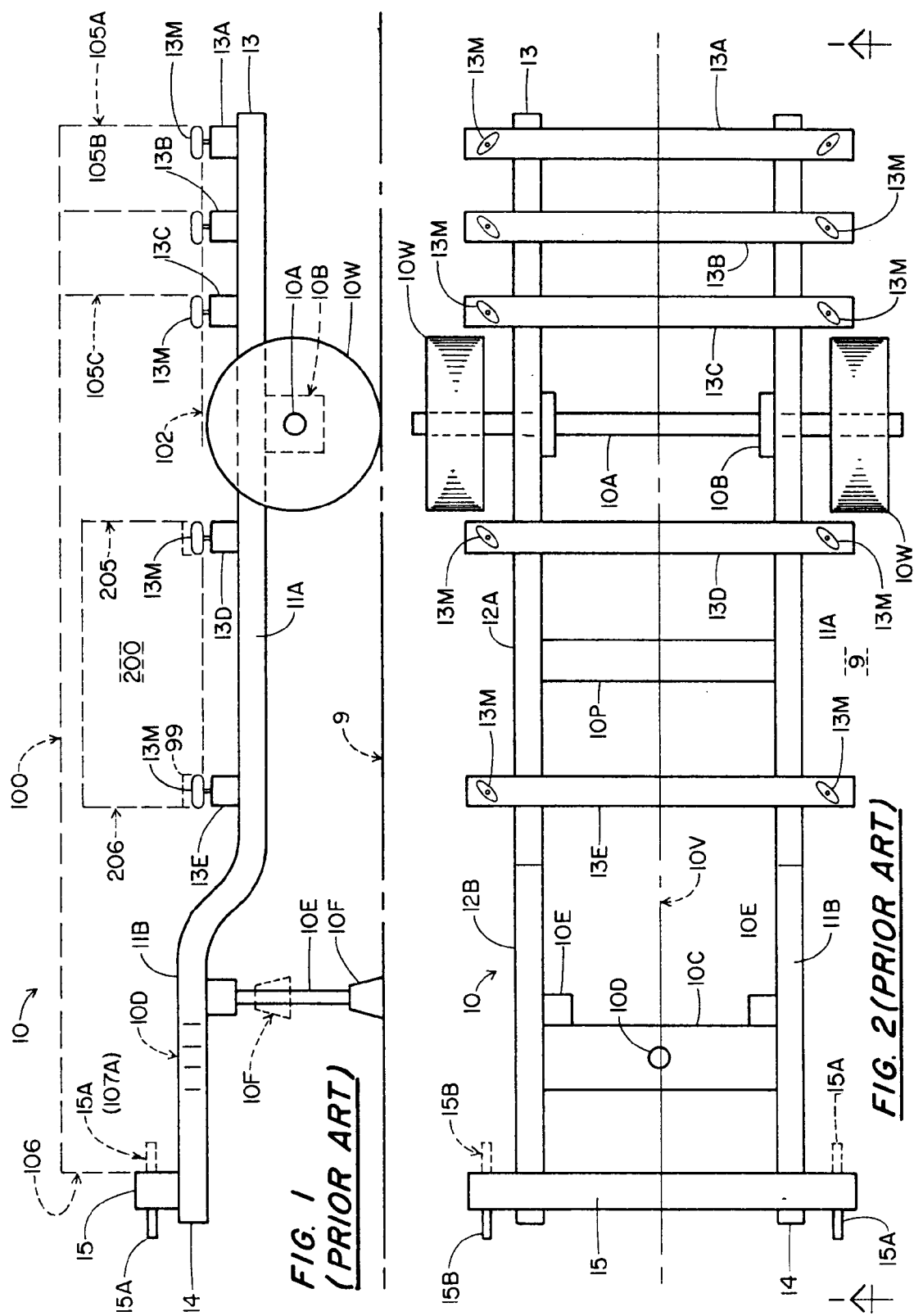
FIG. 2 (aforedescribed) is a top plan view of a representative prior art "gooseneck-type roadway-chassis" (10), and FIG. 1 (aforedescribed) is an elevational view thereof as seen along line 1—1 of FIG. 2.
Figure 6:
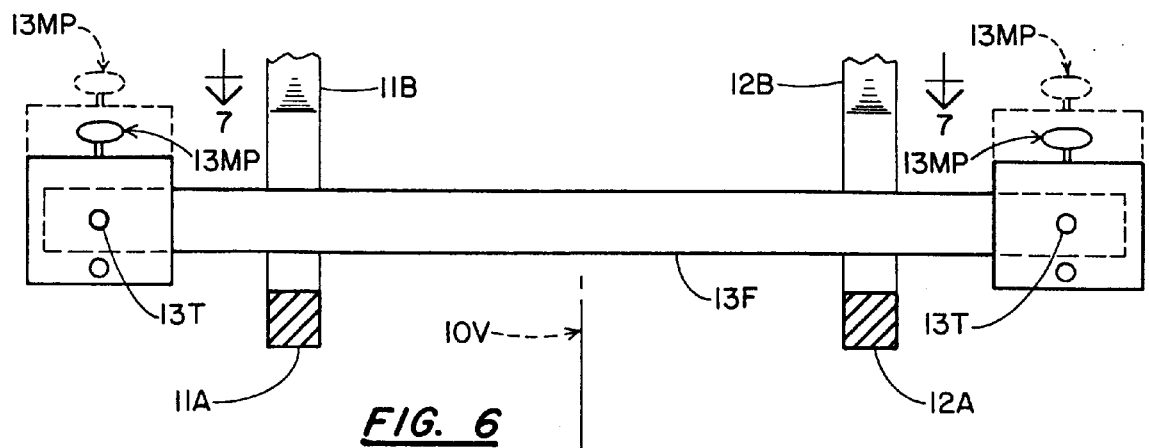
FIG. 6 is a sectional elevational view taken along lines 6—6 of FIGS. 4 and 5.
Figure 7:
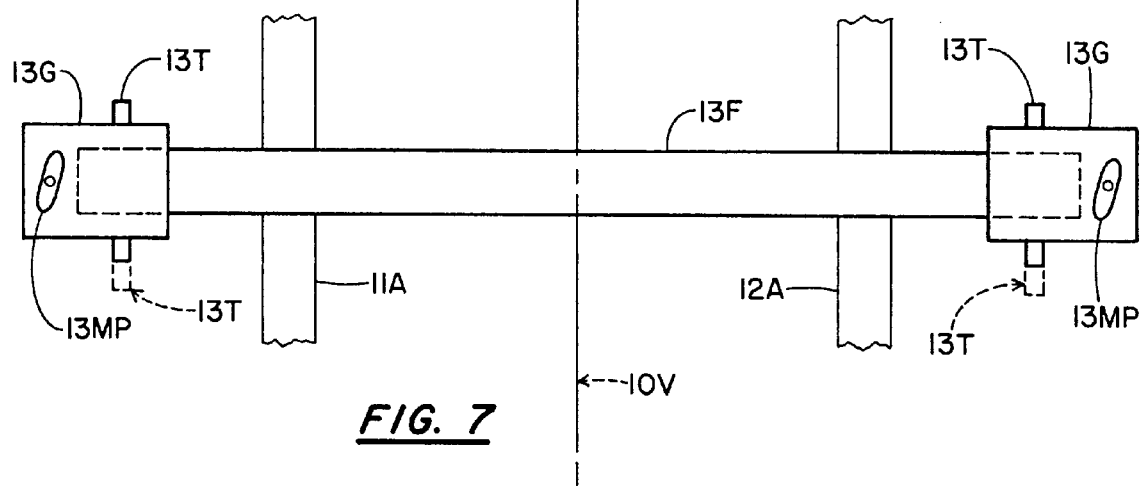
FIG. 7 is a top plan view taken along line 7—7 of FIG. 6.

Accordingly, in view of the above structural modifications included within such improved "gooseneck-type roadway-chassis" (10M) and now with especial reference to drawing FIGS. 4–7, such improved "gooseneck-type roadway-chassis" representative embodiment (10M) might be laudatorily termed ANYSIZER because:

(i) inasmuch as the FIGS. 1 and 2 elements 13A–13E and endward twistlocks 13M therefor, and frontal-member (15) retractable attachment-pins 15A and 15B are retained: the FIGS. 4–7 improved representative embodiment (10M) retains the overlyingly removably-attachable capabilities for cargo-container embodiments 100 and 200, as alluded to in prior art drawing FIG. 1; but also (ii) in view of the FIGS. 4–7 additional structural elements 13M at secondary-bolster 13F, and such secondary-bolster 13F having endwise twistlocks (13MP) of controllable elevation (e.g. 13G, 13T) selectively below and co-planar with gooseneck frontal-member twistlocks (13MN): the FIGS. 4–7 improved representative embodiment (10M) is additionally alternatively adapted to overlyingly removably-attachably accommodate two longitudinally serial half-overall-length cargo-containers (e.g. 200 of FIG. 3C) having arrested-finite-height (AFH) and in roadway-chassis-attached heightwise conformity with roadway-vehicular conformity heightwise Highway Regulations.

From the foregoing, the construction and operation of the improved "gooseneck-type roadway-chassis" concept of the present invention will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. Improved gooseneck-type roadway-chassis comprising:

(A) a pair of directionally longitudinally extending rails maintained in parallel flanking relationship to a vertical-plane and said rails terminally lying along a horizontal rear-end and a horizontal front-end that is topically provided with a horizontal frontal-member having a horizontal topical-plane, each of said rails including parallel and directionally longitudinally co-extensive major rearward lengths and also including parallel and directional longitudinally co-extensive minor and elevationally higher gooseneck forward-lengths; said rearward-lengths being attachably topically provided with a plurality of directionally horizontally transversely extending and directionally longitudinally consecutively spaced bolsters including a rearwardmost bolster, a forwardmost bolster, and intermediately positioned bolsters; each of said aforedescribed bolsters in outwardly flanking relationship to said parallel rails rearward-lengths being provided with conventional twistlocks that are respectively removably attachably engageable with a respectively overlying lower-corner-casting of an overlyable box-like cargo-container; and (B) said transversely extending horizontal topical frontal-member being attachably provided with directionally reciprocatable horizontal attachment pins below the topical-plane thereof and in outwardly flanking relationship to said vertical-plane, said frontal member being attachably provided with respective twist-locks above the topical plane thereof and in flanking relationship to the said vertical plane to removably engage the respective lower-corner-castings provided at the frontal-end of an arrested-overall-length cargo-container, and thereby securing an overlyingly arrestable overall-length cargo-container at the said parallel and longitudinally extending forward lengths.

2. The improved Gooseneck-type Roadway-Chassis of claim 1 wherein:

said rails' rearward-length immediately rearwardly of said forwardmost bolster is topically provided with a directionally transversely extending horizontal secondary-bolster provided with such twistlocks in outwardly flanking relationship to said rails rearward-lengths; and means for reciprocatably elevating the said secondary-bolster twistlocks to positions immediately above the rails' gooseneck forward-lengths.

3. Improved Gooseneck-type Roadway-chassis comprising:

(A) a pair of directionally longitudinally extending rails maintained in parallel flanking relationship to a vertical-plane and said rails together having a directionally transversely extending horizontal rear-end and horizontal front-end, said rails at their front-end being topically provided with a horizontal and directionally transverse frontal-member having a horizontal topical-plane, each of said rails including directionally longitudinally co-extensive minor and elevationally higher goosenecked forward-lengths and directionally longitudinally co-extensive major and elevationally lower rearward-lengths; said rearward-lengths being attachably topically provided with a plurality of directionally horizontally transversely extending and directionally longitudinally consecutively-spaced bolsters including a rearwardmost bolster, a forwardmost bolster, and longitudinally intermediately positioned bolsters; each of said bolsters in transversely outwardly flanking relationship to the said parallel rails rearward-lengths being topically provided with twistlocks that are respectively removably attachably engageable with a lower-corner-casting of an overlyable box-like cargo-containers;

(B) said transversely extending horizontal topical frontal-member being attachably provided with directionally reciprocatable horizontal attachment pins below the topical-plane thereof, and in transversely outwardly flanking relationship to said vertical-plane, and said frontal member respectively immediately above said attachment-pins, being provided with twistlocks above the topical plane thereof and in flanking relationship to the said vertical plane to removably engage lower-corner-castings at the frontal-end of an overlying arrested-overall-length cargo-container; and whereby (C) said improved gooseneck-type roadway-chassis is alternatively adapted for removably and directionally longitudinally thereatop attaching either: a single extended-overall-length cargo-container underlyingly centrally longitudinally provided with a partial-tunnel channel for the gooseneck chassis portion; or, two longitudinally consecutive short-length cargo-containers which might be devoid of an underlying tunnel-like channel.

\* \* \* \* \*